Aug. 21, 1962
F. T. BARR ETAL
3,050,454
HIGH FLUX HOMOGENEOUS REACTOR WITH
CIRCULATING FISSILE MATERIAL
Filed March 13, 1957
2 Sheets-Sheet 1
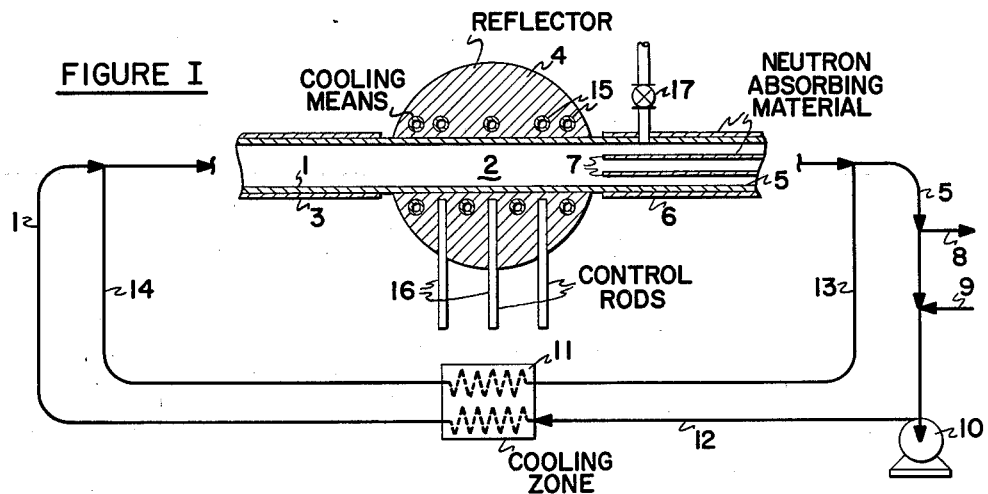
FIGURE I
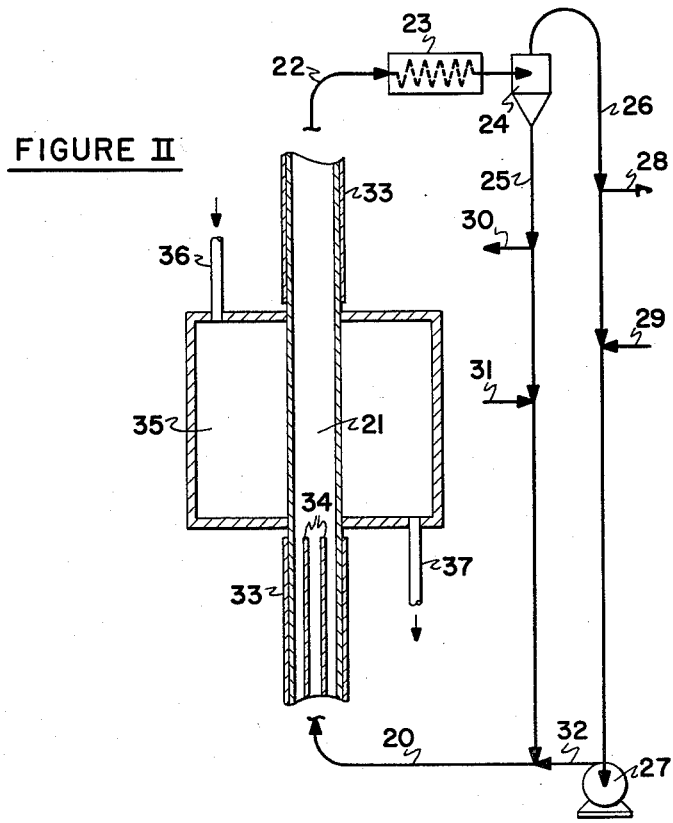
FIGURE II
Frank T. Barr
James F. Black
Inventors
By L. A. Strimbeck   Attorney

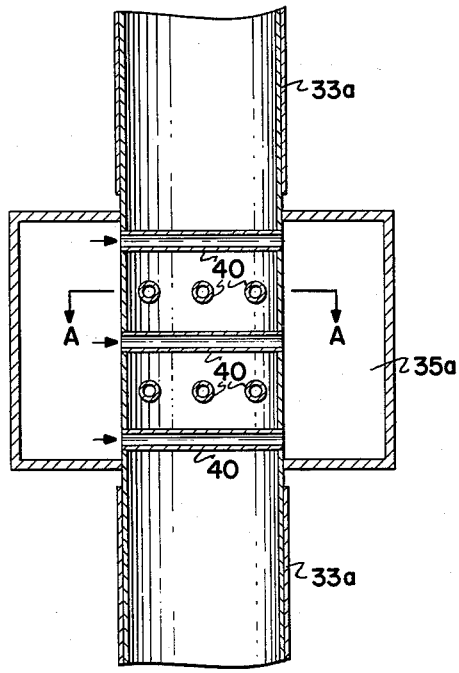
FIGURE III
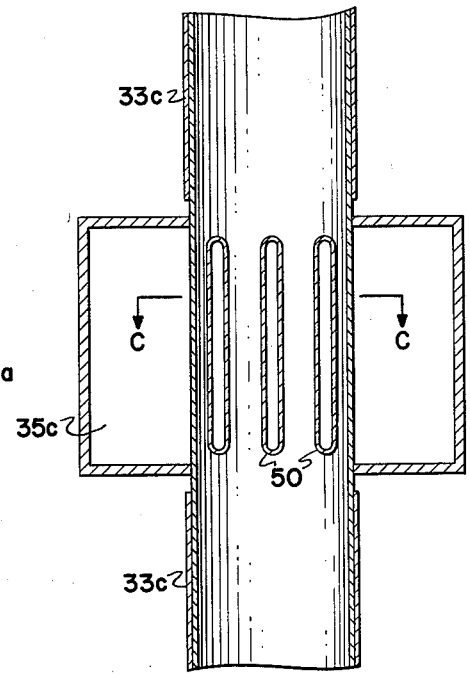
FIGURE V
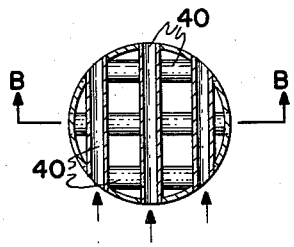
FIGURE IV
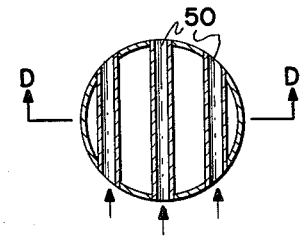
FIGURE VI
Frank T. Barr
James F. Black      Inventors
By L. A. Strimbeck   Attorney

United States Patent Office 3,050,454
Patented Aug. 21, 1962

---

3,050,454
HIGH FLUX HOMOGENEOUS REACTOR WITH CIRCULATING FISSILE MATERIAL
Frank T. Barr, Summit, and James F. Black, Convent, N.J., assignors to Esso Research and Engineering Company, a corporation of Delaware
Filed Mar. 13, 1957, Ser. No. 645,783
14 Claims. (Cl. 204—193.2)

This invention proposes an improved homogeneous nuclear reactor. It is more particularly concerned with an improved nuclear reactor operating with critical amounts of flowing fissile material, wherein provision is made for maintaining the flowing fissile material under sub-critical conditions except when in a defined nuclear reaction zone or core.

In brief, this invention proposes a nuclear reactor system using a homogeneous composition of fissile material wherein the fissile material is passed as a flowing stream through a reaction zone or core. The core is maintained under critical conditions and the fissile material is passed through an outlet flow path, through a cooling zone, and returned through an inlet flow path to the nuclear reaction zone or core.

The particular improvement of this invention comprises maintaining, in axially disposed neutron absorbing relation to the inlet and outlet flow paths, a neutron absorbing material having a capture cross-section above about 10 barns per atom, or about 0.1 cm. per g., for neutrons having an energy within the range of 0.025 to 2.5 ev., in an amount sufficient to maintain the fissile material in the inlet and outlet flow paths in a sub-critical state.

There has been a desideratum for a high flux nuclear reactor. Such reactors, however, have been difficult to design because at high nuclear reaction rates, the high heat flux associated with the reaction causes difficulties. Nuclear reactors have been cooled by suitable cooling methods such as with helium. More recently, it has been proposed to use moving fissile material, by virtue of which it is more amenable to cooling, and to cool the material external to the nuclear reaction zone or core. This invention is concerned with a system wherein at least a major part of the cooling of the nuclear reactor is accomplished external to the core.

In such a system, the homogeneous mixture of fissile material is rapidly passed through the nuclear reaction zone and then is externally cooled to an extent sufficient to prevent an undue temperature rise in the reaction zone before being recirculated. Such flowing systems are, however, limited by the size of the flow paths necessary to convey the fissile material to and from the core. The material in the flow paths must be maintained in a sub-critical condition in order to obtain control of the nuclear reaction, and this is usually at the expense of conditions most favorable for moving the fissile material, e.g., an undue pressure drop must be taken. Ideally, the flow paths to and from the core should be of the same or of a larger cross-section than the core.

It has now been found that the nuclear reaction zone or core volume can be defined and the nuclear reaction can be satisfactorily controlled by providing contiguous to the inlet and outlet flow paths, but separated from the reaction zone, a high neutron absorbing material arranged in such a manner as to maintain the fissile material in the flow paths in a sub-critical condition although the fissile material in the flow paths, in the absence of such neutron absorbing material, would be in a critical state.

In this manner, it is possible to operate a nuclear reactor at a very high flux, i.e., above $10^{15}$ neutrons per square centimeter per second (n./cm.$^2$/sec.), and at a very high heat generation rate, i.e., above 20,000 kw. per pound of fissile material in the core. Such high flux nuclear reactors are especially suitable for high flux irradiation processing.

The design of this invention greatly improves the safety and the ease of controlling the system. Very high rates of circulation of the fissile material can be used which, with conventional systems, would be unattainable. The neutron absorbing material used in the manner of this invention clearly defines the core, and the use of constrictions in the flow path is avoided.

This invention will be made clear by the following description, with reference to the drawings attached to and forming a part of this specification.

In the drawings:
FIGURE I schematically illustrates one embodiment of this invention designed primarily for the generation of steam;
FIGURE II illustrates another embodiment designed for chemical processing irradiation;
FIGURE III illustrates one design of the reaction zone of the apparatus of FIGURE II;
FIGURE IV, taken along the line A—A of FIGURE III, is a cross-sectional view of part of the apparatus illustrated in FIGURE III, FIGURE III being a sectional view taken along line B—B of FIGURE IV;
FIGURE V illustrates another design of the reaction zone of FIGURE II; and
FIGURE VI is a cross-sectional view of part of the apparatus illustrated in FIGURE V, FIGURE V being a sectional view taken along line D—D of FIGURE VI.

In FIGURES II, III, IV, V, and VI, the same reference number has been used for like parts, with subscripts $a$ and $b$ being used to distinguish the numbers.

This invention is applicable to fast, intermediate, and slow or thermal neutron reactors, although better control is obtained with thermal and intermediate neutron energy nuclear reactions. For fast reactors the neutron absorbing material referred to above can have a capture cross-section as low as one barn for neutrons of 1 mev. energy.

By a "homogeneous reactor" is meant one wherein the fissile material exists in a form amenable to being moved or flowed. The fissile material can be a gas or vapor, a liquid, or a particulate solid. While a solid can not be considered, in an absolute sense, to give a homogeneous system, if it is capable of flow and any reasonable volume of the flowing material has a substantially uniform composition, as is true in the fluidized solids technique, the system is considered within the purview of this invention.

An example of a suitable gaseous or vaporous fuel is uranium hexafluoride under about 500–1000 pounds' pressure. The liquid form of the fuel can be a compound of the fissile material that is naturally liquid under the reaction conditions such as uranium tetrafluoride or uranium tetraiodide, or can be a solute of a suitable compound—a gas, solid or liquid—such as uranium dissolved in liquid bismuth, uranium phosphates, sulfates, nitrates, or the like dissolved in water, or suitable admixtures of uranium or uranium oxy-salts designed to promote solubility, avoid corrosion, etc. Suitable solid materials are the oxides of uranium or plutonium, or mixed oxides thereof, carbides, or the metals themselves, either as such or alloyed with satisfactorily high melting diluents.

By "fissile material" is meant those isotopes capable of sustaining a nuclear chain reaction by capture of a neutron and release of further neutrons. Examples known to the art at present are uranium-235, uranium-233, and plutonium-239. The fuel incorporating these fissile materials can comprise the elements of the same nucleus as the above isotopes containing the natural proportion of the fissile material, or the elements can be enriched with the particular fissile material to any extent desired, as is known in the art. As indicated above, the isotopes or elements can exist as such, or can exist as compounds.

By "critical conditions" are meant those conditions wherein the amount and nature of the fissile material and the arrangement thereof are such that a critical mass is achieved, a sustained nuclear reaction or chain reaction occurs and the proportion of neutrons created to neutrons consumed or lost ($k$) is at least equal to one.

By "moderator" is meant a material that has the property of reducing the energy of neutrons without causing undue loss of them. A moderator is necessary in slow or intermediate reactors. As with the case of the fissile material, the moderator can be either a fluid, i.e., a liquid or gas, or can be a solid. While preferably the moderator is in admixture with the flowing fissile material, it can be located in fixed relationship in or around the core. Suitable examples of moderators are: hydrogen, deuterium, or helium gas; water, heavy water or hydrocarbon oils, or solid carbon or beryllium. Gaseous moderators must be used under considerable pressure in order to avoid making the critical size of the core too great.

The moderator can serve as the carrier and/or solvent for the fissile material or compounds thereof. The flowing homogeneous material in the reactor system can, of course, include other materials that are not normally considered as appreciably influencing the course of the nuclear reaction. These are usually limited to low or negligible amounts except when performing a needed function. Such a function may be used as solvent. In any event, the other materials will be chosen to avoid undue neutron absorption.

The nuclear reaction zone or core can have disposed in or about it materials that act as reflectors and aid in the conservation of neutrons. In many cases the moderator and reflector can be the same. The reflector can also be either gaseous, liquid or solid, solid reflectors being preferred. Examples of preferred reflecting materials are carbon, beryllium, or solid compounds thereof, such as beryllium oxide. Water or heavy water can be used if a liquid reflector is needed The neutron absorbing material used to control the criticality of the flowing fissile material in the flow paths is an isotope that has a sufficiently high neutron capture cross-section to be of interest. While the capture cross-section varies with the energy of the neutrons, broadly defined, the elements useful for the purpose of this invention have a capture cross-section of at least 10 barns for neutrons having an energy in the range of 0.025 to 2.5 ev. Examples of such isotopes are osmium, tungsten, tantalum, cesium, manganese, gold, silver, cobalt, chlorine, mercury, lithium, cadmium, and boron, those at the end of the list, especially the last three, being generally more effective than those at the beginning. Specific isotopes of these elements are more effective than the natural mixture in some cases. For example, boron-10 is five times as effective as ordinary boron, and cadmium-113 is eight times as effective as ordinary cadmium. However the difficulty of obtaining specific isotopes will ordinarily preclude their practical use. Compounds of the element or isotope can be used. The neutron absorbing material can be gaseous, liquid or solid, with the solid state being preferred. Examples of preferred materials are metallic cadmium, cadmium oxide, free boron, boron carbide, boron-aluminum alloys, boron nitride, cobalt oxide, and cobalt sulfide.

The neutron absorbing material can be disposed in, or around the circumference, of the inlet and outlet flow paths in amounts sufficient to reduce the K value in these zones below one so that sub-critical conditions are maintained within the flow paths. For example, the neutron absorbing material can form a part of the conduit defining the flow path or can exist as rods, bars, plates, etc. in or near the flow paths. The amount of fissile material present, the amount of moderator, the arrangement of the system, etc. will, of course, dictate the amount of neutron absorbing material that must be used.

With reference to FIGURE I, there is shown a homogeneous reactor system incorporating the teachings of this invention. For purposes of illustration, the flowing material can be considered to be a water solution of a uranium phosphate with the water serving as a moderator. the uranium in the uranium phosphate solution is enriched to an extent of 90% with the isotope $U^{235}$. In all, there is 4 wt. of $U^{235}$ in the water solution.

This water solution is circulated by line 1 into the core 2 of a nuclear reactor. Line 1 is coated with a neutron absorbing material 3, such as cadmium that serves to reduce the K value of the water solution below one such that sub-critical conditions exist in conduit 1. Core 2 of the reactor is surrounded in this case with a suitable reflecting material 4, e.g., graphite. The neutron absorbing material terminates outside the core of the reactor. Thus, when the water solution flows into the core, critical conditions are achieved and a sustained chain reaction results. Accompanying this chain reaction is a high release of heat. This heat is taken up by the water solution. For example, the temperature of the water solution entering in conduit 1 can be 300° F., and the temperature leaving can be 600° F., the system being maintained under suitable pressure.

The water solution so heated by the chain reaction is flowed by line 5 from the core. Line 5 is also surrounded by a neutron absorbing material 6, so that the absorption of neutrons by the material causes the water solution flowing from the core to go into a sub-critical state. The drawing illustrates a variation of the invention wherein some or all of the neutron absorbing material can exist as rods or plates 7 within the flowing water solution. These plates or rods can, of course, be encased with suitable material such as aluminum or stainless steel, which encasing is necessary if gaseous or liquid neutron absorbers are used.

The disposition of the absorbing material defines the boundaries of the core, where the nuclear reaction is critical. The exact dimensions and placement of this material must be determined by specific calculation and experiment, depending on the particular design used. In general, however, the core boundaries defined by the absorbent material will be 5–15 inches inside the closest absorbent.

The heated material in line 5 is then circulated through a cooling zone. At any time within its cycle, the water solution can be withdrawn, as by line 8, to permit the separation of impurities, recovery and concentration of the fissile material, removal of fission products, etc., and addition of fresh water solution can be made, as by line 9. The contents of line 5 are circulated, in this case, by a pump 10 and then passed through a cooling zone 11 via line 12. This cooling zone can be used simply to cool the circulating water solution, but is preferably and is usually a means for obtaining beneficial heat energy from the water solution. For example, it can be a means of converting water to steam, which steam can then be used to advantage in a turbine for the generation of electric power. The flowing fissile material is cooled in cooling zone 11 to an extent sufficient so that when return to core 2, the temperature of the core does not become excessive.

While lines 1 and 5 are shown as continuous lines, they can of course be branched off into a plurality of lines to reduce the flowing fissile material to less than critical mass so that the neutron absorbing material coating supplied to the inlet and outlet lines from the core can be dispensed with on the branched lines, as will be appreciated by those skilled in the art. For example, lines 13 and 14, can circulate some of the fissile material in a separate circuit to cooling zone 11, or to another cooling zone if necessary to avoid criticality.

The reflector can be cooled, if desired and necessary, by suitable cooling means. For example, water cooling coils 15 can be located in the reflector. Control rods 16 are also illustrated in the drawing. These can be used to control the reaction rate in core 2, and can also be used for emergency shutdown, means being provided (not shown) to rapidly move one or more of the rods 16 into the core upon the imminence of runaway conditions. The control rod, as is known, is made of a high neutron absorbing material similar to that used to control the criticality of the mass in the inlet and outlet flow paths in the manner of this invention.

The choice of fissile material and moderator, if used, is such preferably that the system will fail safe, i.e., if runaway conditions are approached, a natural physical or chemical change in the circulating material will counteract the conditions causing the runaway state. This is true of the water solution system used in FIGURE I because if an excessive neutron flux were obtained in core 2, excessive heat would be generated causing conversion of the water to steam and thus dilution of the nuclear reactants in the core and a slowdown of the nuclear reaction. The pressure caused by such an expansion can be suitably relieved, if desired, by a line containing a safety or pressure relief valve 17.

The fluidized solids system shown in FIGURE II will also fail safe because the solid material, whether fissile material or moderator, upon cessation of circulation, will collapse to the bottom portion of the reactor and being so condensed, there will not be sufficient moderator present to bring about the chain reaction.

*Example*

With reference ot FIGURE I, a water solution of uranium phosphate containing 2 wt. percent of $U^{235}$ is circulated through a 2′4″ I.D. line at a linear velocity of 15 ft./sec. The core is a 30″ long section in the pipe and has a volume of 8 cubic feet. The reflector for the core comprises a 2 foot thickness of water surrounding the pipe and extends 10 inches past the ends of the core. The neutron absorber used according to this invention is a 0.01″ equivalent thickness of boron around the inlet and outlet sections to the core and in addition a 1 centimeter diameter boron rod in the center of the inlet and outlet lines. The absorber starts 10 inches away from the core at either end. The average thermal neutron flux in the core is $5 \times 10^{15}$ n./cm.$^2$/sec. and the maximum fast neutron flux is $10^{16}$ n./cm.$^2$/sec. The heat production is 110,000 kw./lb. of fissile material in the core. The system is under a pressure of 2000 p.s.i. and the water flow rate is 400 gallons per second. The water inlet temperature to the core is 350° F. and the outlet temperature is 650° F. The water is cooled and is used to generate steam in an external heat exchanger, which steam is then passed through a turbo-electric generator to obtain about 250,000 kw. of electric power.

With reference to FIGURE II, there is illustrated a fluidized solids system adapted for petroleum processing. In this system the reactor is arranged vertically instead of horizontally as shown in FIGURE I. The fissile material can either be the conveying gas or can be the solid material or part of it. For purposes of illustration it will be assumed that solid uranium oxide having a particle size in the range of about 75 to 200 microns is used as fissile material, although uranium hexafluoride can be used with solid carbon particles suspended in it as moderator. With the solid uranium oxide, a suitable conveying gas, which may also be a moderator, for example, hydrogen or vaporous $D_2O$ can be used. The fluidized uranium oxide particles are circulated by line 20 up through core 21 of the reactor. After passing through the reaction zone and being heated, fluid uranium oxide and hydrogen are passed by line 22 through the cooling zone 23. After passing through cooling zone 23, the solids are separated in a separating system 24, e.g., a cyclone, and are passed through dipleg or standpipe 25 to be repressurized, as is known in the fluidized solids field. The hydrogen gas from separator 24 is transferred by line 26 to circulating compressor 27. Impurities can be removed from the hydrogen gas by withdrawing a portion of it by line 28, and by introducing fresh gas by line 29. Similarly, the uranium oxide can be withdrawn for removal of contaminants and for recovery and reconcentration by line 30, and fresh uranium oxide can be added by line 31.

At the base of standpipe 25, the solids are picked up by the repressurized hydrogen gas supplied by line 32 and are circulated through line 20 to repeat the cycle. In such a system, with solids of a true particle density in the range of 50 to 1200 lbs./cu. ft. using a gas such as hydrogen, steam, carbon dioxide, etc., the solid will be transferred at a rate through the reaction zone in the range of 5 to 5000 lbs./second/sq. ft., at a solids loading in the range of 1 to 400 lbs./cu. ft.

As before, to maintain the flowing material in the inlet and outlet lines in a sub-critical state, the lines are encased with a neutron absorbing material 33 having a high capture cross-section such as boron or cadmium. Some or all of this neutron absorbing material can be located within the flow paths as illustrated by rods 34.

Surrounding core 21 is a petroleum processing zone 35. Reactant is supplied to the zone by line 36 and after a suitable period of radiation, is removed by line 37. Baffling may be used to control the path of flow, and recycling to provide independent control of velocity and time of irradiation can also be used. As an example, a petroleum fraction derived from a paraffinic material of the naphtha boiling range, can be irradiated in zone 35 to the extent of 100 to 500 B.t.u.'s per pound to convert it to a polymeric material having a surprisingly high V.I. and a viscosity suiting it to serve as an excellent automotive engine lubricant.

The system illustrated in FIGURE II is adaptable to multiple use. While obtaining radiation in zone 35 for the chemical conversion, the cooling obtained in zone 23 can be used for development of power. It will also be appreciated, of course, that the system can be used to breed fissile material if desired. The hydrocarbon reaction in zone 35 will serve as a moderator, and thus it is not necessary to place special moderating material about zone 21, although it can be used if desired.

In FIGURES III–VI are shown two preferred adaptations of the core 21 and the processing zone 35 of FIGURE II. The processing zone obtains part of its irradiation by absorbing energy from neutrons having energies above the thermal level. For this reason it is desirable to reduce or eliminate non-process moderator in and around the core and to provide moderator for the nuclear reaction in the form of process material to the greatest extent possible.

In FIGURES III and IV, horizontal tubes 40 running across the core allow circulation of the process material moderator through the core. In FIGURES V and VI this circulation is provided by deep narrow conduits 50, whose outside shape is such as to reduce interference with high velocity flow of the fissile material suspension flowing upwardly through the core. The flow of process material in conduits 40 and 50 can be by natural or forced convection.

Depending on the size of the core, and minor effects of materials of construction, the atomic ratio of ordinary hydrogen in the core moderator to uranium-235 in the core should be of the order of 100 to 1000/1. In the absence of the designs of FIGURES III–VI, to achieve this ratio and maintain a high enough amount and space density of fissile material in the core to make the core critical, the density of hydrogen atoms must approach the order of magnitude of that existing in liquid water. This can be achieved by operating with gaseous hydrogen as suspending gas and moderator, but 1500–15,000 pounds' pressure is required. It is preferred on this account to operate with liquid hydrocarbon process material in the core as moderator as discussed above. This material should occupy about 20 to 80% of the volume in the core, preferably 40 to 60%.

To obtain maximum neutron flux for a given heat production, the amount of fissile material in the core should be as small as will satisfactorily maintain criticality. It is preferred to use about 2–10 pounds in total core volumes of 1–10 cubic feet. The heat removal capacity of the suspended solids can be increased by depositing the fissile material on finely divided inert solids such as carbon, silica, alumina, etc., or mixtures thereof, and maintaining the proportion of the suspending gas and solid at such a level as to keep the aforementioned space density of fissile material in the core at all times.

It will be appreciated that appropriate shielding must be provided around all parts of the fissile material stream circulating through the reactor.

Having described this invention, what is sought to be protected by Letters Patent is succinctly set forth in the following claims.

What is claimed is:

1. In a nuclear reaction process wherein a homogeneous fluid composition of fissile material is passed as a flowing stream through a flow path and through a reaction zone, a sustained nuclear reaction being maintained in said reaction zone, and the cross-sectional area of at least an appreciable portion of said flow path being at least equal to the cross-sectional area of said reaction zone so that normally critical conditions would exit in said portion of said flow path, the improvement which comprises maintaining in neutron absorbing relationship to said portion of said flow path a neutron absorbing material having a capture cross-section above 10 barns per atom for neutrons having an energy in the range of 0.025 to 2.5 ev., the amount of said neutron absorbing material being sufficient to maintain said portion of said flow path in a sub-critical condition.

2. The improvement of claim 1 wherein the neutron flux in said reaction zone is above $10^5$ n./cm.$^2$/sec. and wherein the heat generated is above 20,000 kw. per pound of fissile material in said reaction zone.

3. The improvement of claim 1 wherein a fluid moderator is associated with said fissile material.

4. The improvement of claim 1 wherein a neutron reflector is disposed about said reaction zone.

5. The improvement of claim 1 wherein said neutron absorbing material is at least in part disposed circumferentially about said flow path.

6. The improvement of claim 1 wherein said neutron absorbing material is at least in part located within said flow path.

7. The improvement of claim 1 wherein said neutron absorbing material is a solid material selected from the group consisting of lithium, cadmium and boron.

8. The improvement of claim 1 wherein said homogeneous fluid composition is circulated through an external cooling zone and cooled therein to an extent sufficient to prevent an undue temperature rise in said reaction zone.

9. The improvement of claim 1 wherein a chemical processing zone containing an organic reactant is disposed about said reaction zone and receives neutron radiation therefrom.

10. The improvement of claim 1 wherein there are two of said portions of said flow path, with said reaction zone being intermediate of said portions.

11. A nuclear reactor comprising: an elongated conduit adapted to contain a flowing homogeneous fluid composition of fissile material and of a size sufficient to permit critical conditions to be maintained therein; neutron absorbing material having a capture cross-section above 10 barns per atom for neutrons having an energy in the range of 0.025 to 2.5 ev., said material being disposed in neutron absorbing relationship to said conduit, being present in an amount sufficient to maintain sub-critical conditions in said elongated conduit, and being arranged in two spaced portions defining thereby a nuclear reaction zone intermediate of said portions; a chemical processing chamber disposed about said nuclear reaction zone; and a conduit passing through said nuclear reaction zone, connected with said chamber, and adapted to contain flowing organic material undergoing neutron irradiation.

12. A nuclear reactor comprising an elongated conduit; a homogeneous fluid composition of fissile material intermediate of the ends of said conduit and undergoing a sustained nuclear reaction therein; a portion of said conduit adjacent to the zone of said sustained nuclear reaction having a cross-sectional area at least equal to the largest cross-sectional area of said zone and said zone being of a size sufficient to sustain critical conditions; neutron absorbing material having a capture cross-section above 10 barns per atom for neutrons having an energy in the range of 0.025 to 2.5 ev. and disposed in neutron absorbing relationship to said portion of said elongated conduit in an amount sufficient to maintain sub-critical conditions therein; and means for continually circulating said homogeneous fluid composition to and removing said homogeneous fluid composition from said elongated conduit.

13. The reactor of claim 12 wherein there are two of said portions, with said zone of sustained nuclear reaction being intermediate of said portions.

14. The reactor of claim 13 comprising in addition thereto means for cooling said homogeneous fluid composition removed from said elongated conduit and returning the composition so cooled to said elongated conduit.

References Cited in the file of this patent

UNITED STATES PATENTS

| | | |
|---|---|---|
| 2,815,321 | Wigner et al. | Dec. 3, 1957 |
| 2,900,316 | Kaufman et al. | Aug. 18, 1959 |
| 2,902,424 | King | Sept. 1, 1959 |

FOREIGN PATENTS

| | | |
|---|---|---|
| 697,601 | Great Britain | Sept. 23, 1953 |
| 749,064 | Great Britain | May 16, 1956 |

OTHER REFERENCES

Briggs et al.: "International Conference on the Peaceful Uses of Atomic Energy," vol. 3, p. 180, August 1955.

Busey et al.: "Nucleonics," vol. 13, No. 11, pp. 72–75, November 1955.

Morris et al.: "Atomics," pp. 215–217 and 223, June 1956.

"Chemical and Engineering News," Aug. 6, 1956, pp. 3754 and 204/154.28F.

Went et al.: "Nucleonics," September 1954, pp. 16–19, 204/1954.28F.